United States Patent
Marks et al.

(10) Patent No.: US 7,814,414 B2
(45) Date of Patent: Oct. 12, 2010

(54) RELATIVE ATTRIBUTES OF FLOATING OBJECTS

(75) Inventors: Alan L. Marks, Seattle, WA (US); Eric Dana Bailey, Redmond, WA (US); Jason Todd Barnett, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1433 days.

(21) Appl. No.: 11/223,422

(22) Filed: Sep. 9, 2005

(65) Prior Publication Data

US 2007/0061709 A1    Mar. 15, 2007

(51) Int. Cl.
G06F 3/048    (2006.01)
G09G 5/00    (2006.01)

(52) U.S. Cl. ............... 715/243; 715/209; 715/234; 715/788; 715/848; 345/619; 345/650

(58) Field of Classification Search ......... 715/775, 715/205, 202, 788, 804, 200, 201, 204, 207, 715/209, 210, 214, 231, 234, 238, 243, 244, 715/245, 246, 251, 255, 273, 274, 823, 848, 715/852, FOR. 205, FOR. 227, FOR. 228, 715/FOR. 229, FOR. 230; 707/517; 345/630, 345/418, 440, 440.2, 441, 619, 650, 652, 345/653, 654, 655, 661, 663, 676, 678, 679, 345/680, 681
See application file for complete search history.

(56) References Cited

U.S. PATENT DOCUMENTS

| | | | | |
|---|---|---|---|---|
| 5,349,648 A | * | 9/1994 | Handley | 715/205 |
| 5,416,900 A | * | 5/1995 | Blanchard et al. | 715/804 |
| 5,736,990 A | * | 4/1998 | Barrus et al. | 345/630 |
| 5,737,507 A | * | 4/1998 | Smith | 345/666 |
| 5,841,435 A | * | 11/1998 | Dauerer et al. | 715/775 |
| 6,411,974 B1 | | 6/2002 | Graham et al. | 707/531 |
| 6,667,750 B1 | * | 12/2003 | Halstead et al. | 715/788 |
| 6,928,610 B2 | * | 8/2005 | Brintzenhofe et al. | 715/202 |
| 7,302,648 B1 | * | 11/2007 | Brunner et al. | 715/788 |
| 7,484,182 B1 | * | 1/2009 | Smith | 715/794 |
| 2002/0029232 A1 | * | 3/2002 | Bobrow et al. | 707/517 |
| 2004/0153974 A1 | | 8/2004 | Walker, Jr. | 715/531 |
| 2004/0207658 A1 | | 10/2004 | Awada et al. | 345/747 |

(Continued)

FOREIGN PATENT DOCUMENTS

EP    0 376 695 A3    4/1990

OTHER PUBLICATIONS

"Lesson 4.2: Entering and Formatting Text in GoLive"; pp. 1-4; http://www.adobe.com/education/webtech/CS2/unit_site_dev1/eft_font_size.htm.

(Continued)

*Primary Examiner*—Laurie Ries
*Assistant Examiner*—Maikhanh Nguyen
(74) *Attorney, Agent, or Firm*—Merchant & Gould, P.C.

(57) ABSTRACT

Relative attributes of floating objects are disclosed. A user may obtain a floating object and specify that an attribute of the floating object is relative to a layout object of a page. In one aspect, the magnitude of relativity is determined, and the attribute of the floating object is maintained in accordance with the magnitude of relativity. In this manner, a page remains dynamically robust during page formatting operations and/or changes in page layout.

14 Claims, 9 Drawing Sheets

U.S. PATENT DOCUMENTS

| | | |
|---|---|---|
| 2005/0038770 A1 | 2/2005 | Kuchinsky et al. .............. 707/1 |
| 2005/0097080 A1 | 5/2005 | KethiReddy et al. ........... 707/3 |
| 2005/0154995 A1* | 7/2005 | Miller et al. ................. 715/772 |
| 2005/0179945 A1 | 8/2005 | Sojian et al. ............... 358/1.18 |
| 2005/0188307 A1 | 8/2005 | Bailey et al. ................ 715/531 |
| 2009/0049406 A1* | 2/2009 | Epstein ....................... 715/810 |

OTHER PUBLICATIONS

"How to resize the controls on a Microsoft Off form"; pp. 1-4; http://kbalertz.com/kb_827009.aspx.

* cited by examiner

RELATIVE ATTRIBUTES OF FLOATING OBJECTS

BACKGROUND

During the development of a page in a document application, a user may integrate objects that "float" within the page. These floating objects are generally not inline with other objects. Therefore, a user may manually drag or move the floating objects around the page until the desired position and/or size is achieved. The user repositions and resizes the floating objects until the user has achieved a desired look, a desired feel, and/or desired proportions for the floating objects.

Typically, sizing and positioning of floating objects is manual. A user may be required to directly enter dimensions and coordinates to size and position a floating object. In other typical situations, floating objects may be sized in relation to the floating object itself. As an example, a user may enlarge a floating object by a percentage. In such a situation the floating object is enlarged or shrunk by a percentage of its original size. A user may manually size and position a floating object in a manner that looks good with the page layout. However, such manual sizing and positioning is time consuming and inefficient, because when the user makes a modification to the page layout, the user must manually resize and reposition the floating object so that it looks good again.

Manual sizing and positioning of floating objects are also inefficient for floating object vendors and template vendors. When creating a floating object and/or a template for use on another's computing device, vendors must make assumptions about the page layout that the end user will implement. The vendors must make such assumptions so that floating objects and templates look good in association with the page layout. In many situations, the vendors' assumptions are incorrect, and the end user implements a different page layout than the page layout that the vendor assumed. In such a situation, the end user must manually resize and reposition each of the floating objects so that they look good again in relation to the changed page layout.

SUMMARY

This Summary is provided to introduce a selection of concepts in a simplified form that are further described below in the Detailed Description. This Summary is not intended to identify key features or essential features of the claimed subject matter. Also, this Summary is not intended for use as an aid in determining the scope of the claimed subject matter.

Embodiments of the disclosure relate to relative attributes of a floating object. Some embodiments of the disclosure relate to relative sizing of floating objects. Other embodiments of the disclosure relate to relative positioning of floating objects. As a succinct summation of a few aspects of the disclosure, a user may obtain a floating object and specify that the attributes of the floating object are relative to a layout object of a page. In one aspect, the magnitude of relativity is determined, and the attributes of the floating object are maintained in accordance with the magnitude of relativity. In this manner, a page remains dynamically robust during page formatting operations and/or changes in page layout. A user may make changes to a page layout and the floating objects automatically readjust the attributes in accordance with their dependency and relativity.

As is more fully set forth herein, relative attributes of floating objects provides document robustness even when layout objects of a document are modified. Relative attributes of floating objects allow a user to implement and maintain appealing ratios for elements of a document. For example, a user may implement the "Golden Ratio" to floating objects associated with a document. This ratio is maintained regardless of the modifications made to the page layout objects. In such a manner, page generation and modification is simplified. Also, vendor provided floating objects and templates are efficient to implement and modify. The vendor may create a look for floating objects associated with a template. The vendor may set the look based on dependencies and relativities. Accordingly, when the end user makes modifications to the layout of the template, the look remains as the vendor envisioned, because the floating objects automatically readjust to remain relative.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
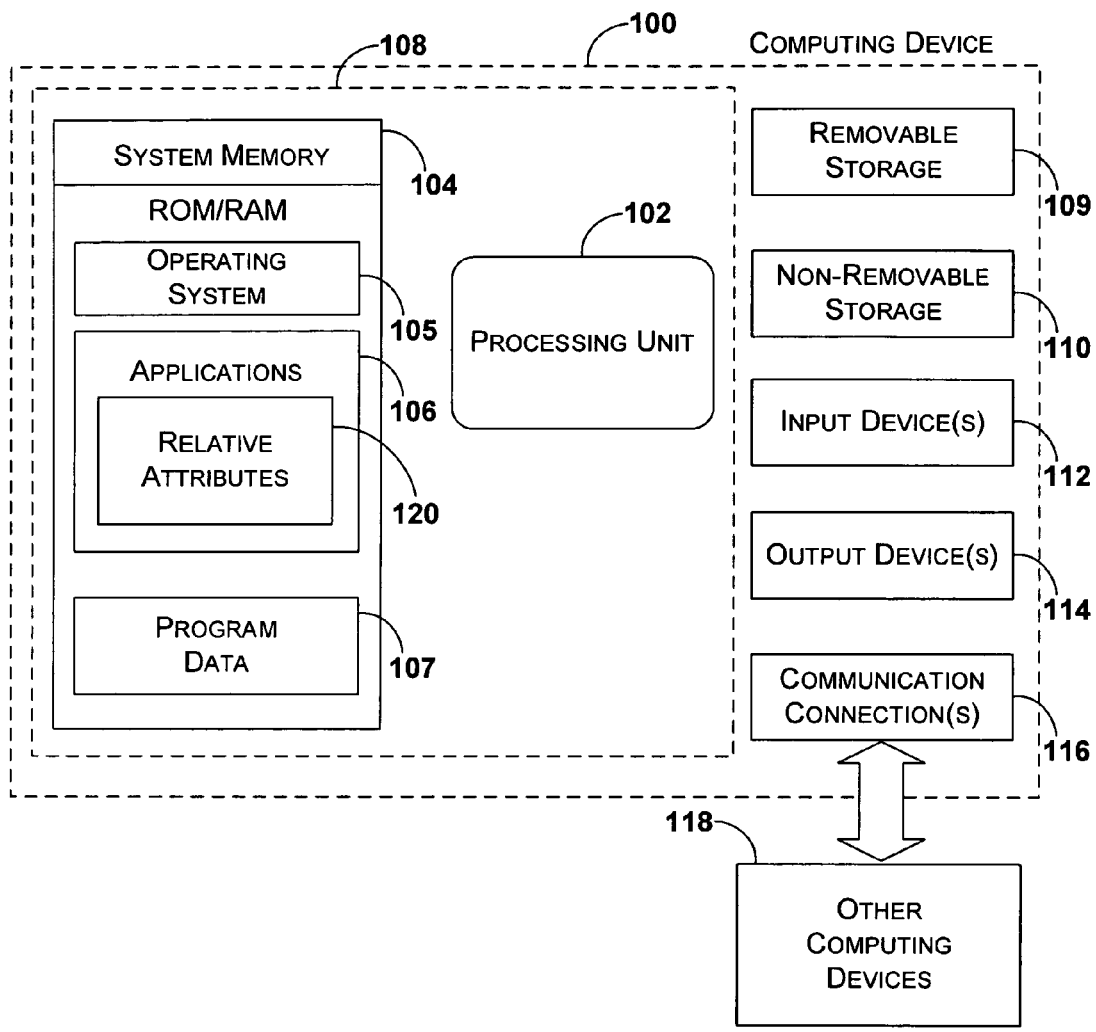
FIG. 1 illustrates an exemplary computing device that may be used in one aspect of the present invention.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Embodiments of Attributes of Floating Objects

Embodiments of the disclosure relate to relative attributes of floating objects. Some embodiments of the disclosure relate to relative sizing of floating objects. Other embodiments of the disclosure relate to relative positioning of floating objects. As a succinct summation of a few aspects of the disclosure, a user may obtain a floating object and specify that the size and/or position of the floating object is relative to a layout object of a page. In one aspect, the magnitude of relativity is determined, and the size and/or position of a floating object are maintained in accordance with the magnitude of relativity. In this manner, a page remains dynamically robust during page formatting operations and/or changes in page layout.

As one example of a few aspects of a disclosure, a user may obtain a text box floating object and determine that the size (e.g. the height and/or the width) is relative to a dimension associated with a column. As another example, a user may obtain a text box floating object and determine that the position is relative to a dimension associated with a margin. In such a situation, the text box is sized relative to the dimension of the column and the text box is positioned relative to the dimension of the margin. The user may also change layout objects without changing the relativity of the text box floating object. For example, the user may change the dimensions associated with the margin and/or the dimensions associated with the column. However, in doing so, the text box floating object may keep the same relativity with respect to the column and/or margin.

In keeping with the above example, the user may set the width of the text box floating object to be fifty percent relative to a column width. If the column width is one inch, the width of the text box floating object is half of an inch. If the column width is modified to half an inch, the width of the text box floating object is automatically changed to a quarter of an inch. Likewise, the user may set the position of the text box floating object to be fifty percent relative to a margin width. If the margin is one inch, the position of the text box floating object is positioned at half of an inch relative to the origin of the margin. If the margin width is modified to half an inch, the position of the text box floating object is automatically changed to a quarter of an inch relative to the origin of the margin.

As another example of at least one aspect of the disclosure, relative sizing and/or positioning may provide several advantages to floating object vendors or template vendors. For example, a vendor may generate floating objects or templates for use with a layout application. The vendor may integrate relatively sized and/or positioned floating objects within the template. In this manner, the vendor does not need to make assumptions regarding how the user will format the layout objects associated with the template. The user may obtain such a template, make changes to one or more layout objects and the floating objects remain relative to the layout objects of the template. Accordingly, the integrity and look of the template remains intact.

As is more fully set forth herein, relative attributes of floating objects provides document robustness even when layout objects of a document are modified. Relative attributes of floating objects allow a user to implement appealing ratios for elements of a document. A user may implement the "Golden Ratio" to floating objects associated with a document. This ratio is maintained regardless of the modifications made to the page layout objects. In such a manner, page generation and modification is simplified. Also vendor provided floating objects and templates are efficient to implement and modify.

Figure 3:
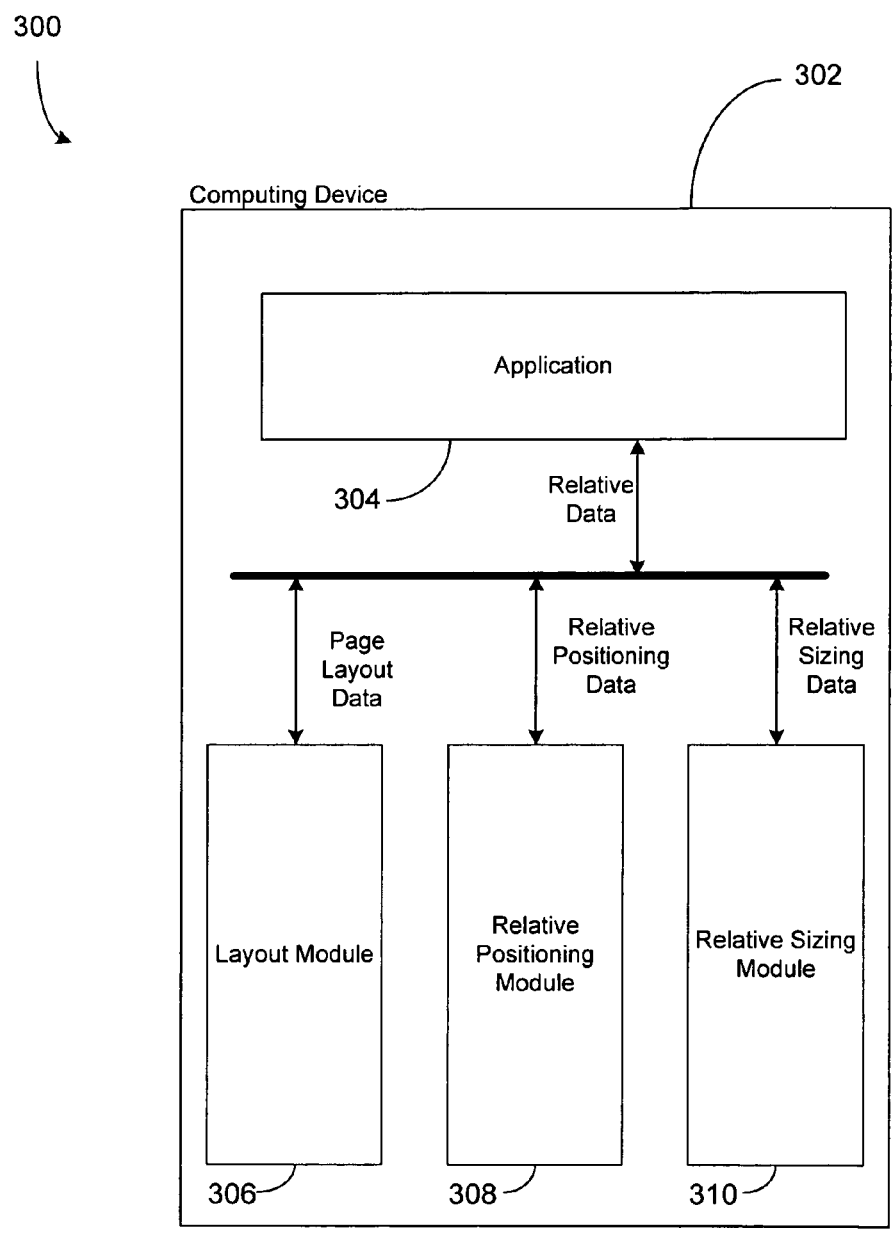
FIG. 3 represents one exemplary system overview for relative attributes of a floating object.

FIG. 3 represents one exemplary system overview 300 for relative attributes of a floating object. As is more fully set forth herein, a floating object may include a text box, a shape, a picture, a graph, a chart, a sidebar, a callout or any other type of object that "floats" in the document. In one aspect, a floating object includes an object that is not rendered inline with respect to other objects.

Computing device 302 represents a general modular overview of some aspects of the disclosure. Computing device 302 may be integrated as a combination of software and hardware elements, an operating system or any combination thereof. Hardware, databases, software or applications referenced herein may be integrated as a single element or include various elements in communication with one another.

Software and/or hardware elements are depicted herein for explanatory purposes only and not for limiting the configuration to multiple elements or a single element performing several functions. Elements of computing device 302 may "live on" a single computing device or a plurality of computing devices in communication with one another. Aspects of computing device 302 may include computing device 100 as exemplified in FIG. 1 and/or mobile computing device 200 as exemplified in FIG. 2. Computing device 302 may include application 304, layout module 306, relative positioning module 308, and relative sizing module 310. As set forth above, other attribute modules are contemplated. Reference numbers 304-310 may include separate programs, separate databases, separate computing devices and separate hardware. Reference numbers 304-310 may also include multiple programs, databases, computing devices, hardware or any combination thereof.

In FIG. 3, computing device 302 may include application 304. In one aspect, application 304 facilitates aspects of floating objects. Application 304 may provide aspects of floating object generation. Application 304 may include and/or be associated with a database of floating objects. Application 304 may include templates that incorporate floating objects. In another aspect, application 304 is associated with a network, and application 304 receives floating object related data from a vendor via the network. In one aspect, application 304 may include a document editor, a layout application, and/or a spreadsheet application. In one embodiment, application 304 may be represented by aspects of MICROSOFT WORD from MICROSOFT CORPORATION, headquartered in Redmond, Wash. In another embodiment, application 304 may be represented by aspects of MICROSOFT EXCEL from MICROSOFT CORPORATION, headquartered in Redmond, Wash. Even though specific examples are set forth herein, application 304 may include any application for facilitating aspects of a floating object.

Computing device 302 may also include layout module 306. Even though layout module 306 is depicted in FIG. 3 as a separate module, in one aspect of the disclosure, layout module 306 is a module of application 304. Layout module 306 may include one or more layout objects that are associated with application 304. Layout objects may include objects that facilitate the generation of a document, the editing of a document, and/or instantiating the layout of the same. For example, the layout object may include a page, a document area, a top margin, a bottom margin, a left margin, a right margin, an inside margin, an outside margin, a column, a row, a header, a footer, a comment, a paragraph, and/or any other type layout category for facilitating layout functionality. In one aspect, layout module 306 is associated with application 304 to generate a page or document.

Computing device 302 may further include relative positioning module 308. Even though relative positioning module 308 is depicted in FIG. 3 as a separate module, in one aspect of the disclosure, relative positioning module 308 is a module of application 304. Relative positioning module 308 may facilitate functionality to allow a user to position a floating object relative to a layout object. In one aspect, relative positioning module 308 includes a user interface, such as the user interface more fully described below in conjunction with FIG. 5. As is more fully set forth below, relative positioning module 308 may facilitate the selection of a layout object to base a relative position. Relative positioning module 308 may also facilitate the selection of a magnitude of relativity. Relative positioning module 308 may include an algorithm or calculator for determining an origin of a layout object, determine dimensions of a layout object, and determining a relative position of a floating object based on the determined data associated with the layout object.

Computing device 302 may further include relative sizing module 310. Even though relative sizing module 310 is depicted in FIG. 3 as a separate module, in one aspect of the disclosure, relative sizing module 310 is a module of application 304. Relative sizing module 310 may facilitate functionality to allow a user to size a floating object relative to a layout object. In one aspect, relative sizing module 310 includes a user interface, such as the uses interface more fully described below in conjunction with FIG. 4. As is more fully set forth below, relative sizing module 310 may facilitate the selection of a floating object dimension (e.g. height, width, length, depth, area, volume, diameter, radius, circumference) and a layout object to base a relative size. Relative sizing module 310 may also facilitate the selection of a magnitude of relativity. Relative sizing module 310 may include an algorithm or calculator for determine dimensions of a layout object, and determining a relative size of a floating object based on the determined dimensions associated with the layout object.

Figure 4:
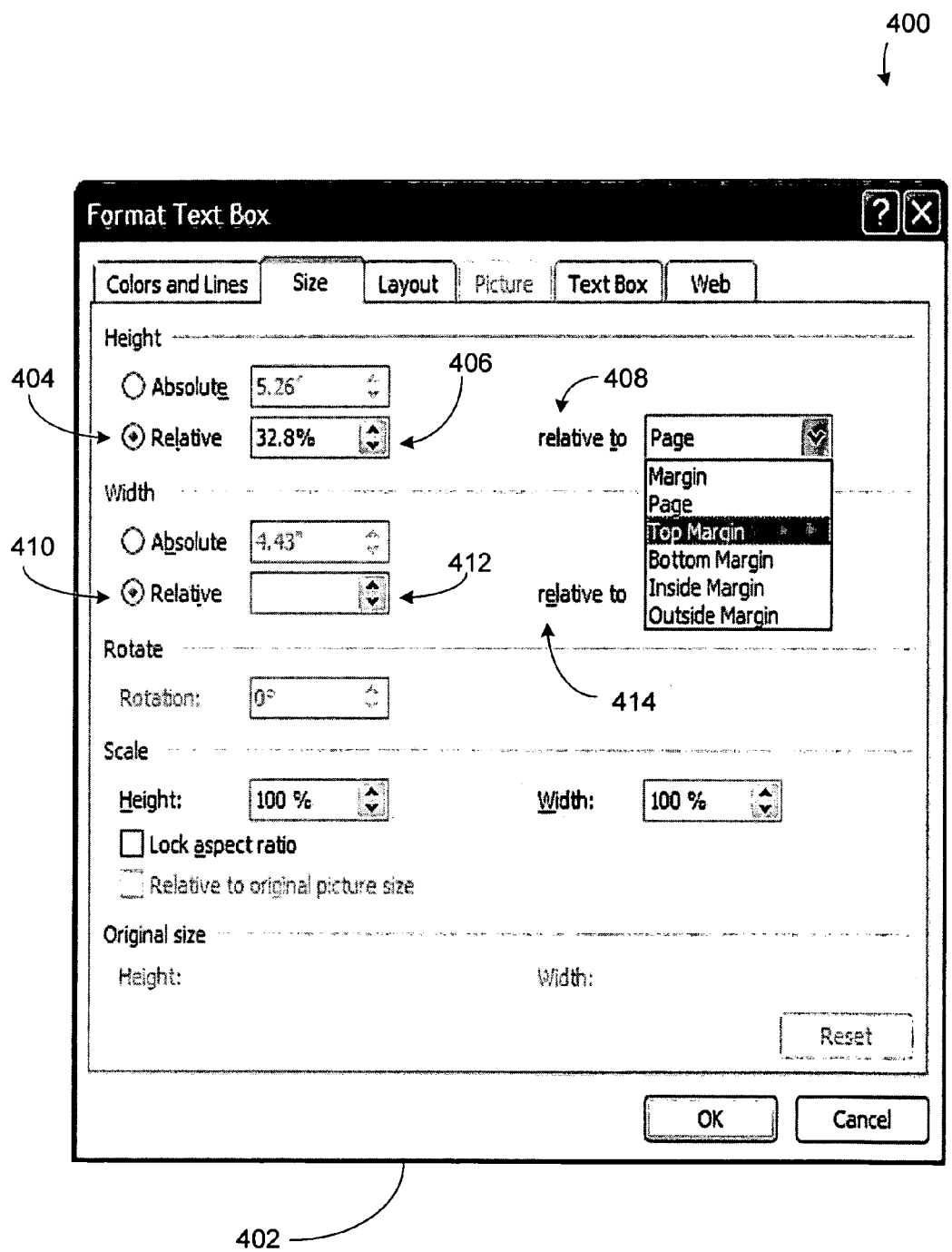
FIG. 4 represents an exemplary user interface that represents a few aspects of relative sizing of a floating object.

FIG. 4 represents an exemplary user interface 400 that represents a few aspects of relative sizing of a floating object. User interface 400 may include relative sizing window 402. Relative sizing window 402 includes a height selector 404 and a width selector 410. Even though height and width are exemplified herein, relative sizing window 402 may include selectors for any dimension that may be associated with a floating object. For example, dimension selectors may include a height selector, a width selector, a length selector, a depth selector, an area selector, a volume selector, a diameter selector, a radius selector, and/or a circumference selector. Height relativity cell 406 includes a cell for selecting or inputting a magnitude of relativity. In one aspect, the magnitude of relativity is a percentage, where the percentage is a percentage of a selected layout object. Layout object cell 408 includes a cell for selecting or inputting a layout object to base relativity. Similarly, width relativity cell 412 includes a cell for selecting or inputting a magnitude of relativity. In one aspect, the magnitude of relativity is a percentage, where the percentage is a percentage of a selected layout object. Layout object cell 414 includes a cell for selecting or inputting a layout object to base relativity. In one aspect, a user may select a layout object and a magnitude of relativity for one dimension of a floating object and a different layout object and a different magnitude of relativity for another dimension of a floating object.

Figure 5:
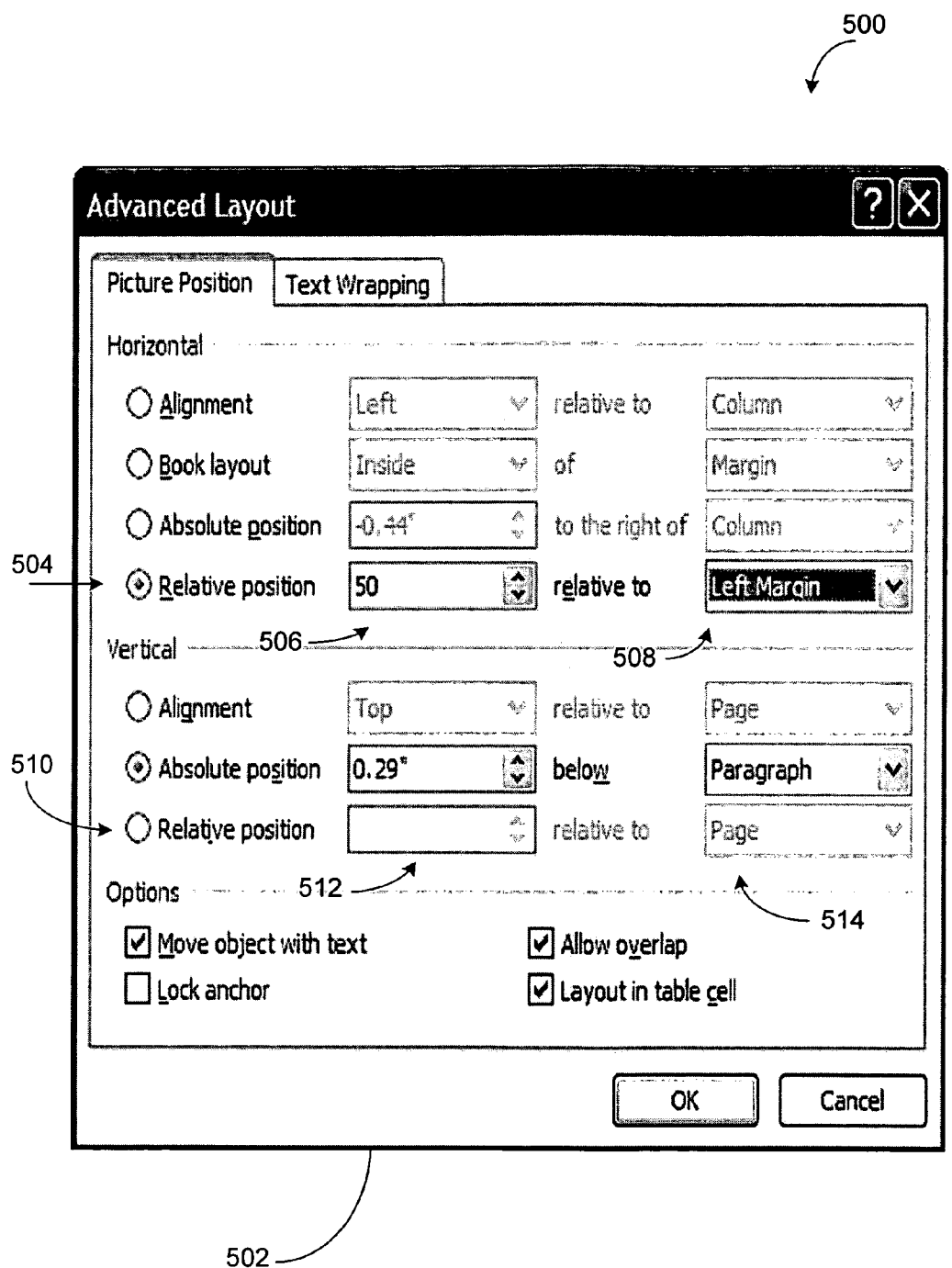
FIG. 5 represents an exemplary user interface that represents a few aspects of relative positioning of a floating object.

FIG. 5 represent an exemplary user interface 500 that represents a few aspects of relative positioning of a floating object. User interface 500 may include relative positioning window 502. Relative positioning window 502 includes horizontal selector 504 and vertical selector 510. Even though horizontal and vertical are exemplified herein, relative positioning window 502 may include selectors for any alignment that may be associated with a floating object. Horizontal relativity cell 506 includes a cell for selecting or inputting a magnitude of relativity. In one aspect, the magnitude of relativity is a percentage, where the percentage is a percentage of a selected layout object. Layout object cell 508 includes a cell for selecting or inputting a layout object to base relativity. Similarly, vertical relativity cell 512 includes a cell for selecting or inputting a magnitude of relativity. In one aspect, the magnitude of relativity is a percentage, where the percentage is a percentage of a selected layout object. Layout object cell 514 includes a cell for selecting or inputting a layout object to base relativity.

Figure 6:
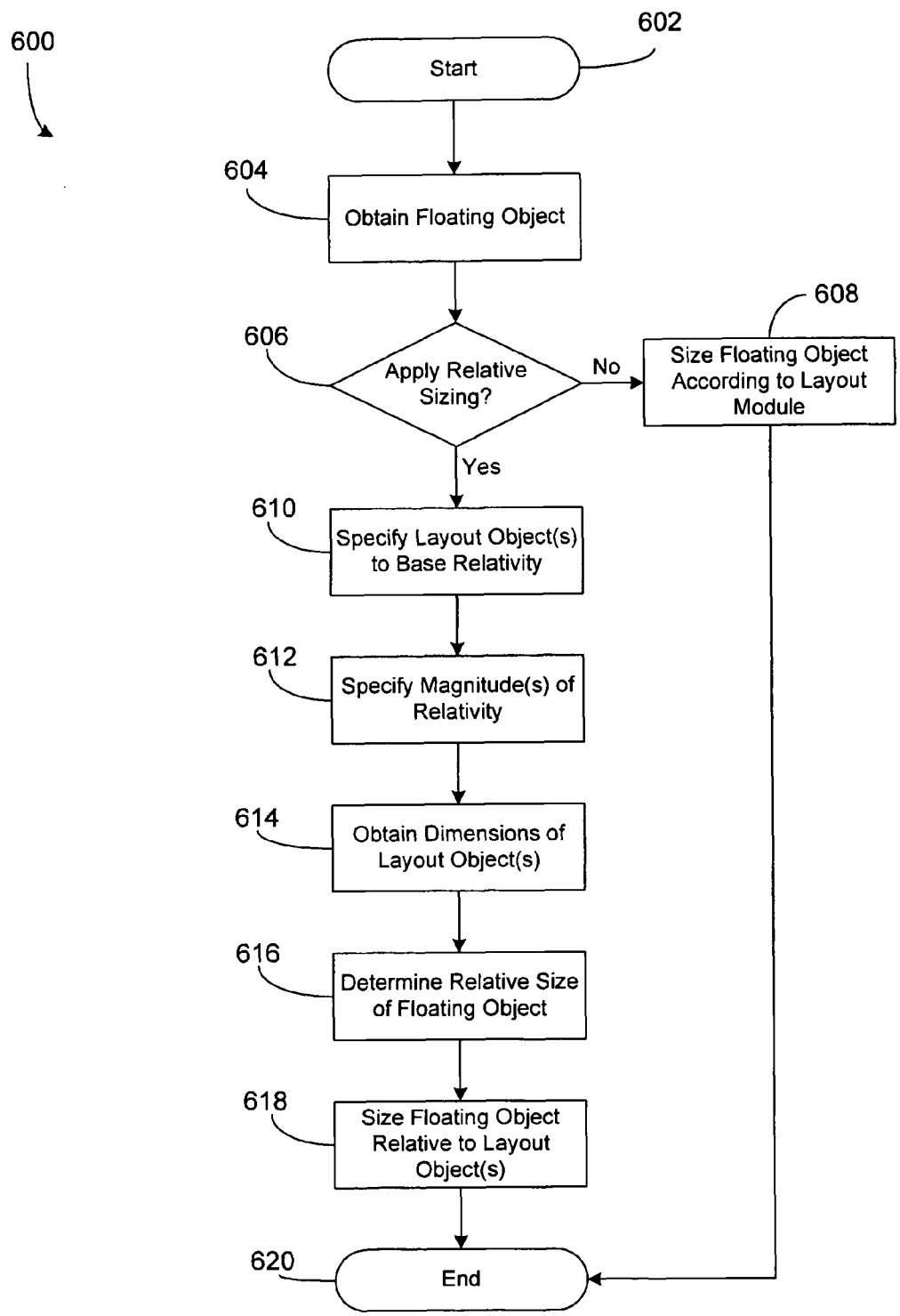
FIG. 6 is an operational flow diagram representing an exemplary embodiment for relative sizing of a floating object.

FIG. 6 is an operational flow diagram representing an exemplary embodiment for relative sizing of a floating object. A floating object may include a text box, a shape, a picture, a graph, a chart, a sidebar, a callout or any other type of object that "floats" in a document. In one aspect, a floating object includes an object that is not rendered inline with respect to other objects. Operational flow 600 begins at start operation 602 and continues to operation 604 where a floating object is obtained. A floating object may be obtained in several different ways. For example, a floating object may be obtained by generation on an application, a floating object may be associated with a template, a floating object may be associated with a database of floating objects, a floating object may be generated by a vendor and transmitted to an application, and/or a floating object may be obtained via a network. In general, a floating object may be obtained in any manner.

Operational flow 600 continues to decision operation 606 where it is decided whether to apply relative sizing. The decision whether or not to use relative sizing may occur in many different manners. For example, a user may instantiate an input to determine whether relative sizing is implemented. As another example, a vendor may pre-configure a vendor floating object or a vendor template for relative sizing. In one aspect, relative sizing may be applied for one dimension of the floating object and not used for another dimension of a floating object. In another aspect, it may be decided not to use relative sizing on any dimensions of the floating object. In such a situation, operational flow 600 continues to operation 608 where the floating object may be sized according to a layout module. For example, a layout module may include a default size, a user may "drag" the size of the floating object with a mouse, and/or the user may input specific dimensions for the layout object. Operational flow 600 may continue to end operation 620.

At decision operation 606, it may be decided to apply relative sizing. In such a situation, operational flow 600 continues to operation 610 where a layout object(s) to base relativity is specified. In one aspect, several layout objects may be specified. A layout object may be specified for each dimension associated with a floating object. For example, the width of the floating object may be made relative to a right margin and the height of the floating object may be made relative to a top margin. Moreover, the layout object may include any layout object of a document. In one aspect, the layout object does not need to be associated with the floating object prior to applying relative sizing. For example, the floating object does not need to be contained within the layout object.

Operation 612 includes specifying magnitude(s) of relativity. A magnitude of relativity may include a percentage. For example, it may be determined that a height of a floating object is to be half the height of a column. In such a situation, the magnitude of relativity is fifty percent. Operational flow 600 continues to operation 614 where dimension(s) of the specified layout object(s) are obtained. The dimension(s) may include any dimension(s) to base relativity. For the example, the dimension(s) may include a height, a width, a length, a depth, an area, a volume, a diameter, a radius and/or a circumference.

At operation 616, the relative size of the floating object is determined. In one aspect, the specified dimension(s) of the layout object(s) are multiplied with the magnitude of relativity to return the floating object dimension. In this manner, a floating object may include a plurality of magnitudes of relativity associated with a plurality of specified dimensions that are associated with a plurality of layout objects. At operation 618, the floating object is sized based on the relativity. In one aspect the floating object is dynamically robust, in that, the floating object is automatically resized in conjunction with the magnitude of relativity in response to changes made to associate layout objects. In one aspect, the layout module sizes the floating object. Operational flow 600 continues to end operation 620.

Figure 7:
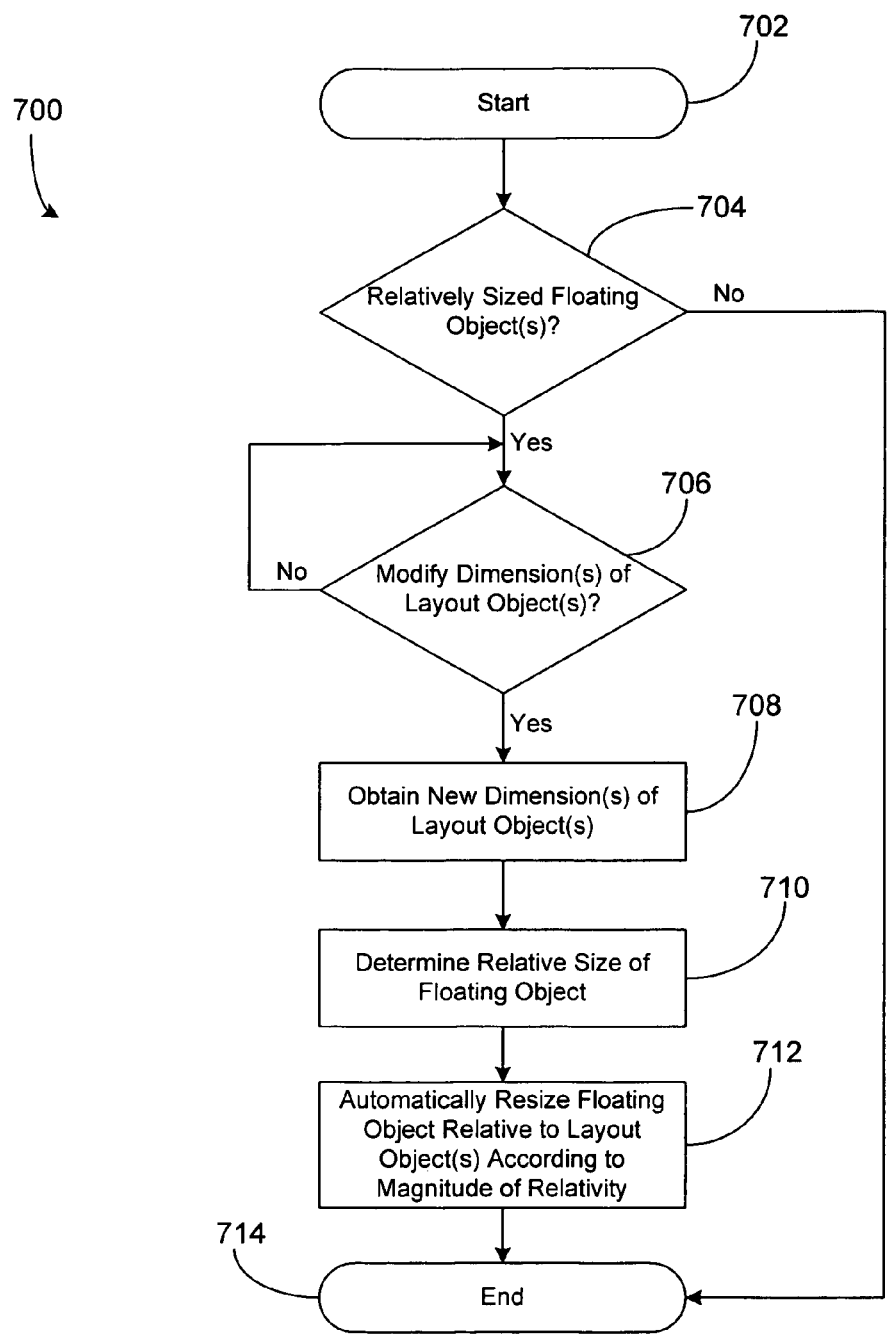
FIG. 7 is an operational flow diagram representing an exemplary embodiment for resizing a floating object.

FIG. 7 is an operational flow diagram representing an exemplary embodiment for resizing a floating object. Operational flow 700 begins at start operation 702 and continues to decision operation 704 where it is determined whether relatively sized floating object(s) exist. Where relatively sized floating objects do not exist, operational flow 700 continues to end operation 714. Where relatively sized floating objects do exist, operational flow 700 continues to decision operation 706, where it is determined whether a dimension of an associated layout object has been modified. Where a dimension of an associated layout object has not been modified, operational flow 700 loops back until a modification has been detected.

Where a dimension of an associated layout object has been modified, operational flow 700 continues to operation 708. Operation 708 includes obtaining the new dimension(s) of the associated layout object(s). At operation 710, the relative size of the floating object is determined based on the new dimension(s) of the layout object(s). In one aspect, the specified dimension(s) of the layout object(s) are multiplied with the magnitude of relativity to return the floating object dimension. Operational flow 700 continues to operation 712 where the floating object is automatically resized relative to the new dimensions and the magnitude of relativity. Operational flow 700 continues to end operation 714.

Figure 8:
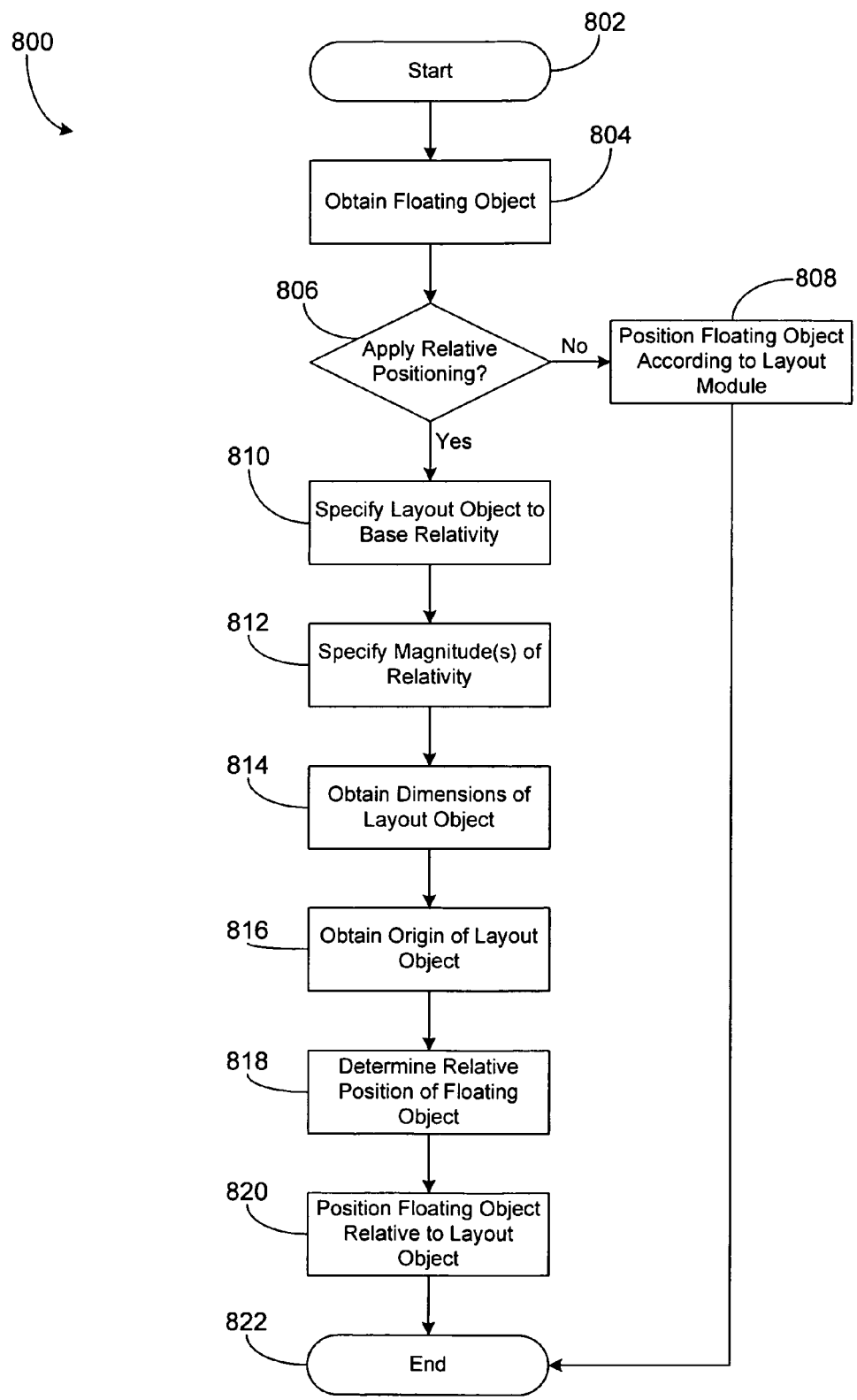
FIG. 8 is an operational flow diagram representing an exemplary embodiment for relative positioning of a floating object.

FIG. 8 is an operational flow diagram representing an exemplary embodiment for relative positioning of a floating object. Operational flow 800 begins at start operation 802 and continues to operation 804 where a floating object is obtained. A floating object may be obtained in several different ways. For example, a floating object may be obtained by generation on an application, a floating object may be associated with a template, a floating object may be associated with a database of floating objects, a floating object may be generated by a vendor and transmitted to an application, and/or a floating object may be obtained via a network. In general, a floating object may be obtained in any manner.

Operational flow 800 continues to decision operation 806 where it is decided whether to apply relative positioning. The decision whether or not to use relative sizing may occur in many different manners. For example, a user may instantiate an input to determine whether relative positioning is implemented. As another example, a vendor may pre-configure a vendor floating object or a vendor template for relative positioning. In one aspect, relative positioning may be applied for one dimension of a floating object and not used for another dimension of a floating object. In another aspect, it may be decided not to use relative positioning on any dimensions of the floating object. In such a situation, operational flow 800 continues to operation 808 where the floating object may be positioned according to a layout module. For example, a layout module may include a default position, a user may "drag" the position of the floating object with a mouse, and/or the user may input specific coordinates for the layout object. Operational flow 800 may continue to end operation 822.

At decision operation 806, it may be decided to apply relative positioning. In such a situation, operational flow 800 continues to operation 810 where a layout object(s) to base relativity is specified. A dimension of a layout object may be specified for a horizontal alignment of a floating object, a vertical alignment of a floating object, or any other alignment associated with a floating object. For example, the horizontal alignment of the floating object may be made relative to a right margin and the vertical alignment of the floating object may be made relative to a top margin. Moreover, the layout object may include any layout object of a document. The layout object does not need to be associated with the floating object prior to applying relative sizing. For example, the floating object does not need to be contained within the layout object.

Operation 812 includes specifying a magnitude(s) of relativity. A magnitude of relativity may include a percentage. For example, it may be determined that a horizontal alignment of a floating object is to be half of a specified dimension of a column. In such a situation, the magnitude of relativity is fifty percent. Operational flow 800 continues to operation 814 where dimension(s) of the specified layout object(s) are obtained. The dimension(s) may include any dimension(s) to base relativity. For the example, the dimension(s) may include a height, a width, a length, a depth, an area, a volume, a diameter, a radius and/or a circumference.

Operation 816 includes obtaining an origin for the layout object. The origin may include a reference point to measure a distance. For example, a right margin may include a one-inch width. The width may begin at the origin of the right margin and extend to a terminal of the right margin. When a one-quarter inch offset relative to the width of the right margin is desired, the offset extends one-quarter inch from the origin toward the terminal. The origin of the layout object may be predetermined, hard coded, selected by a user, set by a vendor, or include any other manner for obtaining the origin of a layout object.

At operation 818, the relative position of the floating object is determined. In one aspect, the specified dimension of the layout object is multiplied with the magnitude of relativity to return the floating object position. At operation 820, the floating object is positioned based on the relativity. In one aspect, positioning includes setting a floating object anchor at determined relative coordinates. The anchor may include the location on the floating object that sets the position. For example, the anchor of a rectangular floating object may include the top-left corner. The anchor of the floating object may be positioned anywhere on the floating object depending on the layout desired. The anchor may include a default position, the anchor may be hard coded, and/or the anchor may be selectable to allow a user or vendor to determine the position of the anchor. In one aspect, the floating object is dynamically robust, in that, the floating object is automatically repositioned in conjunction with the magnitude of relativity in response to changes made to the associated layout objects. In one aspect, the layout module positions the floating object. Operational flow 800 continues to end operation 822.

Figure 9:
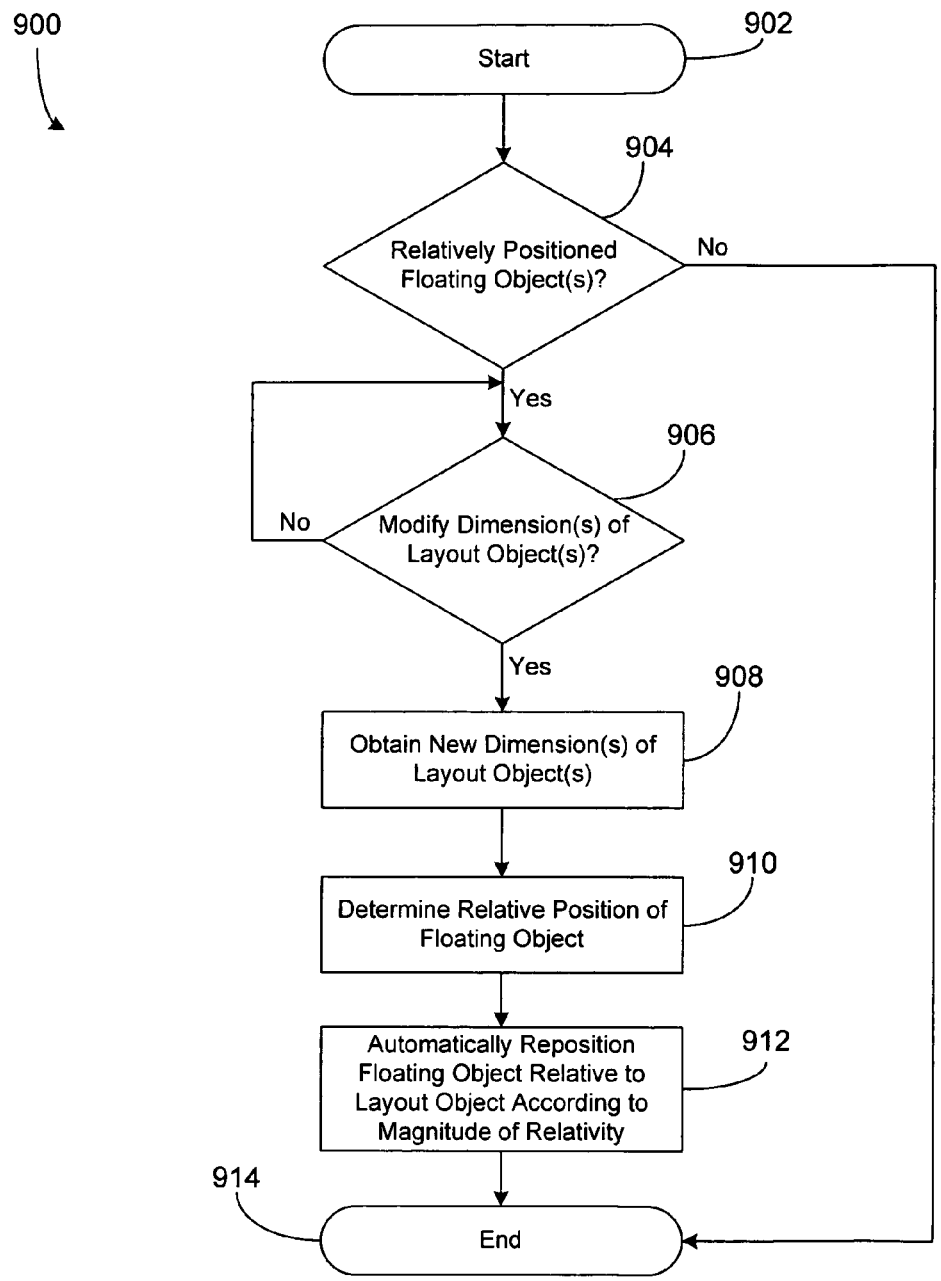
FIG. 9 is an operational flow diagram representing an exemplary embodiment for repositioning a floating object.

FIG. 9 is an operational flow diagram representing an exemplary embodiment for repositioning a floating object. Operational flow 900 begins at start operation 902 and continues to decision operation 904 where it is determined whether relatively positioned floating object(s) exist. Where relatively positioned floating objects do not exist, operational flow 900 continues to end operation 914. Where relatively positioned floating objects do exist, operational flow 900 continues to decision operation 906, where it is determined whether a dimension of an associated layout object has been modified. Where a dimension of an associated layout object has not been modified, operational flow 900 loops back until a modification has been detected.

Where a dimension of an associated layout object has been modified, operational flow 900 continues to operation 908. Operation 908 includes obtaining the new dimension(s) of the associated layout object(s). At operation 910, the relative position of the floating object is determined based on the new dimension(s) of the layout object(s). In one aspect, the specified dimension of the layout object is multiplied with the magnitude of relativity to return the floating object position. Operational flow 900 continues to operation 912 where the floating object is automatically repositioned relative to the new dimension and the magnitude of relativity. Operational flow 900 continues to end operation 914.

Accordingly, aspects of the disclosure promote document robustness even when layout objects of a document are modified. Relative sizing and positioning of floating objects allows a user to implement appealing ratios for elements of a document. A user may implement the "Golden Ratio" to floating objects associated with a document. This ratio is maintained regardless of the modifications made to the page layout objects. In such a manner, page generation and modification is simplified. Also vendor provided floating objects and templates are efficient to implement and modify.

Illustrative Operating Environment

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for relative attributes. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
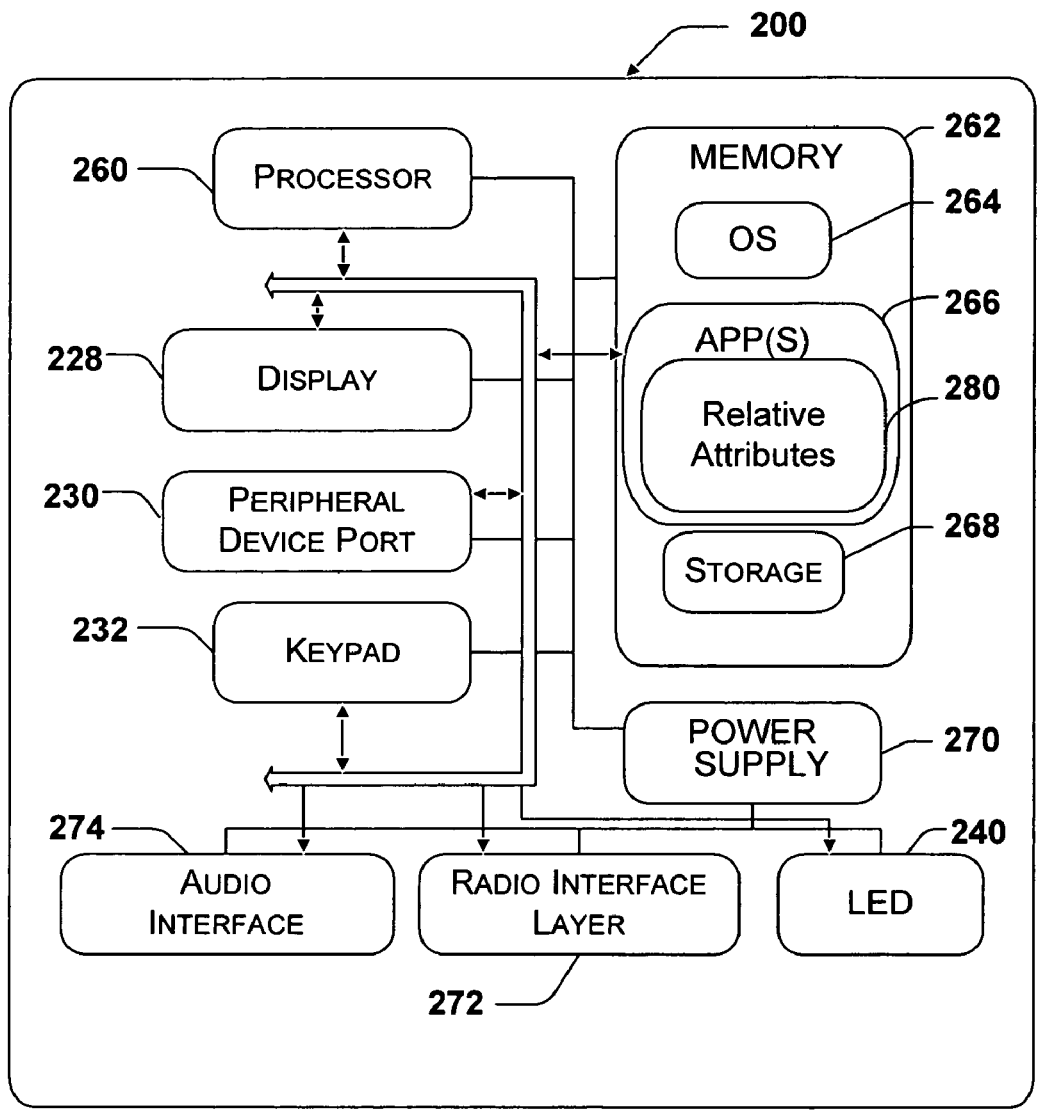
FIG. 2 illustrates an exemplary mobile device that may be used in one aspect of the present invention.

FIG. 2 illustrates a mobile computing device 200 that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for relative attributes.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for maintaining relativity between a floating object and layout display attributes of a document, the method comprising:

obtaining a document that includes page layout attributes of the document;

obtaining a floating object for including in the document;

receiving a selection of a size magnitude of relativity for at least one floating object size dimension, wherein the size magnitude of relativity is a percentage relative to a size dimension of at least one respective page layout attribute of the document, wherein the size magnitude of relativity maintains the relativity of the floating object size dimension with respect to the size dimension of the at least one respective page layout attribute when the size dimension of the at least one respective page layout attribute is modified;

receiving a selection of a position magnitude of relativity for at least one floating object position dimension, wherein the position magnitude of relativity is a percentage relative to a position dimension of at least one respective page layout attribute of the document, wherein the position magnitude of relativity maintains the relativity of the floating object position dimension with respect to the position dimension of the at least one respective page layout attribute when the position dimension of the at least one respective page layout attribute is modified;

upon receiving a modification to the size dimension of the at least one respective page layout attribute, automatically maintaining the relativity percentage of the floating object size dimension according to the size magnitude of relativity; and upon receiving a modification to the position dimension of the at least one respective page layout attribute, automatically maintaining the relativity percentage of the floating object position dimension according to the position magnitude of relativity, wherein the size dimension of the floating object includes at least one member of a group comprising: a height of the floating object, a width of the floating object, a length of the floating object, a depth of the floating object, an area of the floating object, a volume of the floating object, a diameter of the floating object, a radius of the floating object, and a circumference of the floating object, and wherein the position dimension of the floating object includes at least one member of a group comprising: a vertical position of the floating object and a horizontal position of the floating object.

2. The computer-implemented method of claim 1, wherein the floating object includes at least one of: a text box displayed on the document, a shape displayed on the document, a picture displayed on the document, a graph displayed on the document, a chart displayed on the document, a sidebar displayed on the document, and a callout displayed on the document.

3. The computer-implemented method of claim 1, wherein the page layout attributes of the document include at least one member of a group comprising: a document area attribute of the document, a top margin attribute of the document, a bottom margin attribute of the document, a left margin attribute of the document, a right margin attribute of the document, an inside margin attribute of the document, an outside margin attribute of the document, a column attribute of the document, a row attribute of the document, a header attribute of the document, a footer attribute of the document, a comment attribute of the document, and a paragraph attribute of the document.

4. The computer-implemented method of claim 1, wherein the size dimension of the at least one respective page layout attribute of the document includes at least one member of a group comprising: a height dimension of the document, a width dimension of the document, a length dimension of the document, a depth dimension of the document, an area dimension of the document, a volume dimension of the document, a diameter dimension of the document, a radius dimension of the document, and a circumference dimension of the document.

5. The computer-implemented method of claim 1, wherein the position dimension of the at least one respective page layout attribute of the document includes at least one member of a group comprising: a horizontal position and a vertical position.

6. The computer-implemented method of claim 1, wherein obtaining the floating object includes at least one of: generating a floating object, obtaining the floating object from a vendor and obtaining a template from a vendor.

7. A computer-readable storage medium having computer executable instructions for maintaining relativity between a floating object and layout display attributes of a document, the instructions are executed by a processor to perform a method comprising:

obtaining a document that includes page layout attributes of the document;

obtaining a floating object for including in the document;

receiving a selection of a size magnitude of relativity for at least one floating object size dimension, wherein the size magnitude of relativity is a percentage relative to a size dimension of at least one respective page layout attribute of the document, wherein the size magnitude of relativity maintains the relativity of the floating object size dimension with respect to the size dimension of the at least one respective page layout attribute when the size dimension of the at least one respective page layout attribute is modified;

receiving a selection of a position magnitude of relativity for at least one floating object position dimension, wherein the position magnitude of relativity is a percentage relative to a position dimension of at least one respective page layout attribute of the document, wherein the position magnitude of relativity maintains the relativity of the floating object position dimension with respect to the position dimension of the at least one respective page layout attribute when the position dimension of the at least one respective page layout attribute is modified;

upon receiving a modification to the size dimension of the at least one respective page layout attribute, automatically maintaining the relativity percentage of the floating object size dimension according to the size magnitude of relativity; and upon receiving a modification to the position dimension of the at least one respective page layout attribute, automatically maintaining the relativity percentage of the floating object position dimension according to the position magnitude of relativity, wherein the size dimension of the floating object includes at least one member of a group comprising: a height of the floating object, a width of the floating object, a length of the floating object, a depth of the floating object, an area of the floating object, a volume of the floating object, a diameter of the floating object, a radius of the floating object, and a circumference of the floating object, and wherein the position dimension of the floating object includes at least one member of a group comprising: a vertical position of the floating object and a horizontal position of the floating object.

8. The computer-readable storage medium of claim 7, wherein the floating object includes at least one of: a text box displayed on the document, a shape displayed on the document, a picture displayed on the document, a graph displayed on the document, a chart displayed on the document, a sidebar displayed on the document, and a callout displayed on the document.

9. The computer-readable storage medium of claim 7, wherein the page layout attributes of the document include at least one member of a group comprising: document area attribute of the document, a top margin attribute of the document, a bottom margin attribute of the document, a left margin attribute of the document, a right margin attribute of the document, an inside margin attribute of the document, an outside margin attribute of the document, a column attribute of the document, a row attribute of the document, a header attribute of the document, a footer attribute of the document, a comment attribute of the document, and a paragraph attribute of the document.

10. The computer-readable storage medium of claim 7, wherein the size dimension of the at least one respective page layout attribute of the document includes at least one member of a group comprising: a height dimension of the document, a width dimension of the document, a length dimension of the document, a depth dimension of the document, an area dimension of the document, a volume dimension of the document, a diameter dimension of the document, a radius dimension of the document, and a circumference dimension of the document.

11. The computer-readable storage medium of claim 7, wherein obtaining the floating object includes at least one of: generating a floating object, obtaining the floating object from a vendor and obtaining a template from a vendor.

12. A system for maintaining relativity between a floating object and layout display attributes of a document, the system comprising:

a processor;

a memory having computer executable instructions stored thereon, wherein the computer executable instructions are executed by the processor to perform a method comprising:

obtaining a document that includes page layout attributes of the document;

obtaining a floating object for including in the document;

receiving a selection of a size magnitude of relativity for at least one floating object size dimension, wherein the size magnitude of relativity is a percentage relative to a size dimension of at least one respective page layout attribute of the document, wherein the size magnitude of relativity maintains the relativity of the floating object size dimension with respect to the size dimension of the at least one respective page layout attribute when the size dimension of the at least one respective page layout attribute is modified;

receiving a selection of a position magnitude of relativity for at least one floating object position dimension, wherein the position magnitude of relativity is a percentage relative to a position dimension of at least one respective page layout attribute of the document, wherein the position magnitude of relativity maintains the relativity of the floating object position dimension with respect to the position dimension of the at least one respective page layout attribute when the position dimension of the at least one respective page layout attribute is modified;

upon receiving a modification to the size dimension of the at least one respective page layout attribute, automatically maintaining the relativity percentage of the floating object size dimension according to the size magnitude of relativity; and upon receiving a modification to the position dimension of the at least one respective page layout attribute, automatically maintaining the relativity percentage of the floating object size position dimension according to the size position magnitude of relativity, wherein the size dimension of the floating object includes at least one member of a group comprising: a height of the floating object, a width of the floating object, a length of the floating object, a depth of the floating object, an area of the floating object, a volume of the floating object, a diameter of the floating object, a radius of the floating object, and a circumference of the floating object, and wherein the position dimension of the floating object includes at least one member of a group comprising: a vertical position of the floating object and a horizontal position of the floating object.

13. The system of claim 12, wherein the floating object includes at least one of: a text box displayed on the document, a shape displayed on the document, a picture displayed on the document, a graph displayed on the document, a chart displayed on the document, a sidebar displayed on the document, and a callout displayed on the document.

14. The system of claim 12, wherein obtaining the floating object includes at least one of: generating a floating object, obtaining the floating object from a vendor and obtaining a template from a vendor.

* * * * *